May 10, 1966 N. P. TOMLINSON 3,250,466
GOLF YARDAGE COUNTER
Filed April 22, 1965 2 Sheets-Sheet 1

INVENTOR.
NORVIN P. TOMLINSON
BY Oldham & Oldham
ATTYS.

May 10, 1966  N. P. TOMLINSON  3,250,466
GOLF YARDAGE COUNTER
Filed April 22, 1965  2 Sheets-Sheet 2
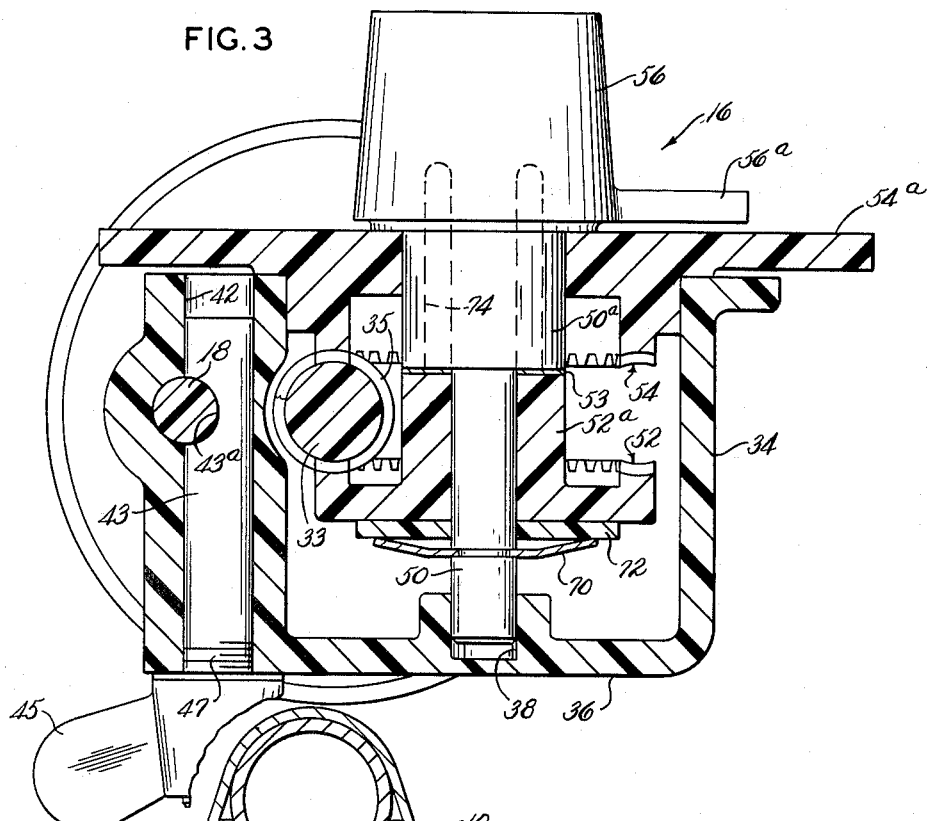
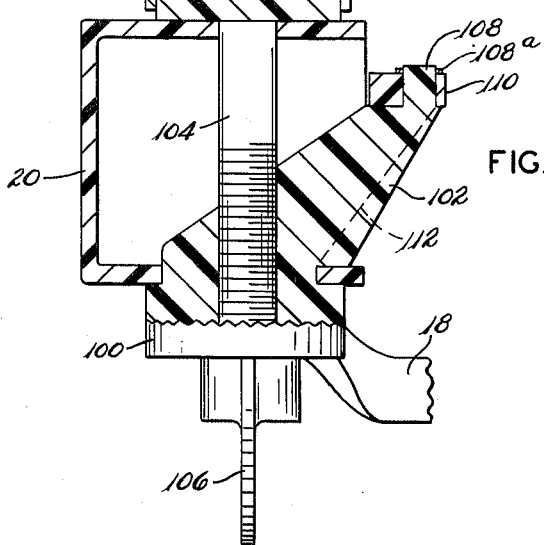
INVENTOR.
NORVIN P. TOMLINSON
BY Oldham & Oldham
ATTYS.

United States Patent Office 3,250,466
Patented May 10, 1966

3,250,466
GOLF YARDAGE COUNTER
Norvin P. Tomlinson, 3162 Sherbrook Drive,
Uniontown, Ohio
Filed Apr. 22, 1965, Ser. No. 449,992
5 Claims. (Cl. 235—95)

This invention relates to ground distance measuring devices, and more particularly to a golf yardage indicator which may readily be attached to a golf cart to indicate or measure the distance the cart has been pulled or pushed from hole to hole during a golf game.

The practice among golfers of overestimating or underestimating the distance from the place at which the ball has come to rest, after it has been driven from the tee, to the next hole, leaving the golfer to select and use for the next stroke or shot a club which will give too much distance, or a club which will gve too little distance, is a very prevalent cause of lost strokes during a golf match. Heretofore, it has been well known that there have been many and various efforts to provide golf yardage indicators for attachments to portable golf carts to measure, accurately, the distance of the tee shot as traveled and/or the distance to the green from where the ball is lying. However, these prior art efforts, indicated generally by Patent Nos. 2,711,027; 2,766,935; 2,742,229; and 2,724,361 have not satisfactorily achieved their desired purpose. Particularly, they have been too expensive, requiring considerable effort to attach to a golf cart, difficult to adjust properly or adapt to a fold up type cart, and extremely complex in their operation.

Therefore, it is the general object of the present invention to avoid and overcome the foregoing and other difficulties of and objections to prior art practices by the provisions of a golf yardage counter of extremely simple mechanical design, made almost entirely from plastic, and which may be resiliently pivoted to and from operating position thereby adapting to collapsible golf carts.

A further object of the invention is to provide an extremely simple mechanical counter utilizing two gears having one tooth difference therebetween with both gears simultaneously driven by a common worm shaft whereby the difference in rotation of the two gears is an accurate indication of the distance traveled by the golf cart.

A further object of the invention is to provide a golf yardage indicator adjustably mounted to an arm which in turn is pivotally mounted to the golf cart which arm is spring loaded tending to move to a vertically downward position when it is moved to either side of a substantially vertically upward position, thereby allowing the yardage indicator to be positioned in a resiliently held stored relationship against the golf cart frame, as well as to be positioned and resiliently held in actuating relationship to the cart.

A further object of the invention is to provide a sturdy golf yardage indicator having very few mechanical parts, substantially all of which may be made from plastic, which parts may be readily and easily assembled without nuts, bolts or screws, and which indicator is extremely accurate in operation, yet very simple and inexpensive.

The aforesaid objects of the invention and other objects which will appear as the description proceeds are achieved in a yardage counter for a golf cart which includes the combination of a mounting arm pivotally mounted on the golf cart, a counter housing slidably mounted on the arm, a shaft rotatably mounted in the housing and extending out one side thereof, a pair of gears mounted in concentric alignment on the shaft whereby one gear is fixed in relation to the shaft and one gear is rotatable, the gears having their teeth in face to face spaced relation and where one gear has fewer teeth than the other, indication means fixed to the end of the shaft extending from the housing, an index dial operatively affixed to the rotatable gear and extending in spaced parallel adjacent relation to the indication means, a worm shaft positioned between and simultaneously engaging the teeth of both gears, a roller drive mounted on the worm shaft and engaging one wheel of the cart to rotatably drive the worm shaft upon rotation of the wheel, and means to resiliently bias the roller drive into contact with the wheel.

For a better understanding of the invention, reference should be had to the accompanying drawings wherein:

FIGURE 3 is an enlarged vertical cross sectional view of the indicator and associated mechanism taken on line 3—3 of FIGURE 1; and FIGURE 4 is a horizontal cross sectional view of the pivotal mounting means as taken on line 4—4 of FIGURE 1.

Figures 1, 2:
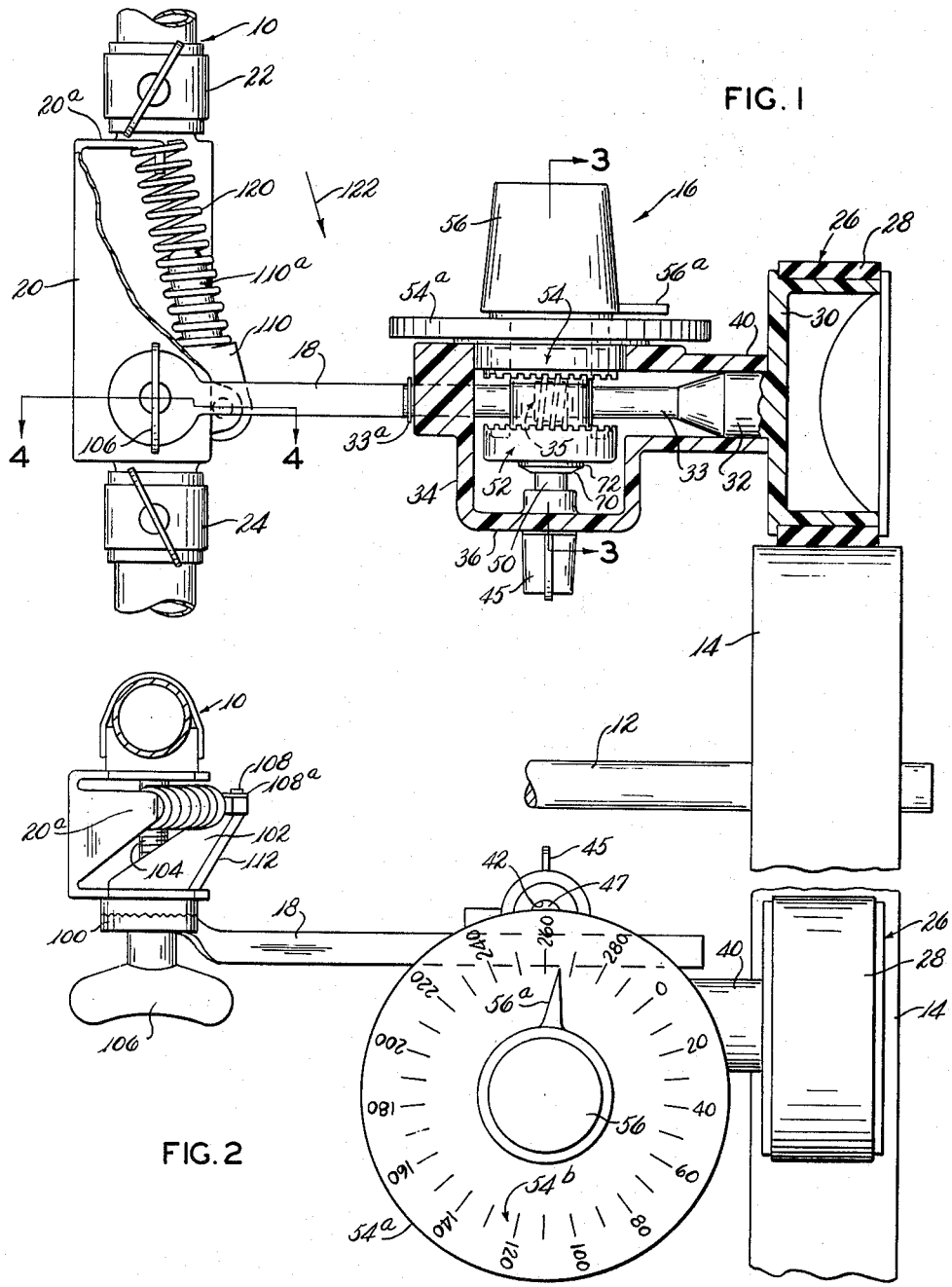
FIGURE 1 is a partially broken away, partially cross-sectioned, elevational view of the yardage indicator of the invention mounted to a golf cart in operating position.
FIGURE 2 is a plan view of the indicator of FIGURE 1.

While it should be understood that the principles and structure of the invention might be applicable to any distance measuring application associated with a rotating wheel, the invention has been designed for and is most applicable to measuring the yardage traveled of a portable golf cart, and hence it has been so illustrated and will be so described.

With reference to the form of the invention illustrated in FIGURE 1 of the drawings, the numeral 10 indicates generally a tubular golf cart frame which will normally be mounted to an axle 12 which is supported by rotatable wheels 14 on both ends thereof, all in the normal and well known manner. The invention contemplates that a golf yardage counter, indicated generally by the numeral 16, is mounted on an arm 18 which is pivotally mounted on a support frame 20. The frame 20 is adjustably carried on the tubular frame 10 by a pair of conventional releasable clamps 22 and 24, respectively, or similar members. The counter 16 is driven by a wheel indicated generally by the numeral 26, which is held in resilient aligned contact with the wheel 14 of the golf cart, all as indicated in FIGURE 1. In order to obtain better friction, the drive wheel 26 has a resilient rubber tread 28. A plastic base or hub 30 integrally formed with the drive shaft 32 mounts the tread 28. The shaft 32 includes an integrally formed worm shaft 33 to effect the drive as more fully explained hereinafter.

The specific details of the counter 16 are more clearly indicated with reference to FIGURE 3. Essentially, the counter 16 comprises a counter housing 34 having an integral concentrically aligned base 36 which defines a journal supporting opening 38. FIGURE 1 clearly shows that the counter housing 34 includes an integrally formed support tube 40 adapted to slidably receive the drive shaft 32 from the drive wheel 26. The housing 34 also is integrally molded to define a mounting hole 42, extending substantially normal to the arm 18, which is received through the housing 34 in offset relation thereto. A retaining rod 43 is slidably received in the hole and has a semicircular groove 43a mating with the arm 18, as indicated. A thumb nut 45 is received on a threaded end portion 47 of the rod 43 to cause a clamping action of the groove 43a onto the arm 18 when the nut 45 is tightened. Thus, the housing 34 may be adjustably locked relative to the arm 18 in both sliding and rotational relation.

The essence of the invention is achieved by mounting an elongated shaft 50 in the opening 38 of the base 36, which shaft extends substantially concentrically aligned with and longitudinally through the housing 34. A pair of crown gears 52 and 54, respectively, are slidably mounted onto the shaft 50 so that the teeth of the gears are in spaced face to face relationship with the teeth of each respective gear being aligned substantially with the axis of the shaft 50. Actually, the invention contemplates that the gear 54 is slidably received around an enlarged diameter portion 50a integrally formed on the shaft 50, which end of the portion 50a contacts a collar 52a of the gear 52. A friction washer 53 is positioned between the butt contact of the collar 52a and the portion 50a. Thus, it should be understood that the gear 52 is rotatable around the shaft 50 and the gear 54 is rotatable about the enlarged portion 50a. The remaining structure comprises a concentric indicator knob 56 which is integrally molded as a part of the shaft 50. The knob 56 extends out the top opening of the housing 34, as seen in FIGURES 1 and 3. An indicator pointer 56a is integrally formed with and extends radially out from the base of the knob 56. As a means to provide yardage indication, the gear 54 has an integrally molded circular top plate 54a with yardage indications 54b imprinted on the top surface thereof. The pointer 56a readily aligns with the indications 54b as seen in FIGURE 2.

In order to insure that rotation of the gear 52 will cause rotation of the knob 56, suitable clutch means are provided, for example, including a Tinnerman spring lock nut 70 locked in relation to the shaft 50 and is positioned to exert upward pressure onto a washer 72 normally forcing the collar or shaft portion 52a of the gear 52 in an upwardly direction causing it to contact the enlarged portion 50a of the shaft 50. In order to insure a good friction meeting of these surfaces, the enlarged portion 50a has a recessed hole 74 therearound substantially adjacent and parallel to the shaft 50 which allows the top surface of the collar or shaft portion 52a to engage in a friction locking relationship through the friction washer 53 with the face of the enlarged portion 50a. Therefore, it is seen that the spring nut 70 causes a frictional clutching action at the friction washer 53 between the faces of the collar or shaft portion 52a and the enlarged portion 50a. However, such friction clutch at 53 allows the knob 56 to be rotated independently of the gear 52 with slippage occurring at the washer 53. Such friction slippage allows the proper setting and adjustment of the dial for each hole of golf played.

In order to provide a relative movement between the index pointer 56a and the indexed yardage marks 54b on the plate 54a, the invention contemplates that the gear 54 will be, for example, a 39 tooth crown gear while the gear 52 will be a 40 tooth crown gear, with rotation of the gears being achieved by the worm shaft 33 rotatably mounted at one end in the housing 34 and driven at the other end by the drive shaft 32. Note the engagement of the short worm section 35 carried by the shaft 33 with both gears 52 and 54, as seen in FIGURE 1. It should be understood that both gears 52 and 54 will rotate in the same direction upon rotation of the shaft 33 and only the relative rotation will vary because of the fewer number of teeth on the gear 54. Thus, displacement between the index pointer 56a and the indices 54b will appear. Of course, the relative number of teeth variation between the gears 52 and 54 could be changed from the figures set forth above, but must be calibrated with the circumference of the drive wheel 26 to insure that the relative displacement between the index pointer 56a and the indices 54b accurately represents the yardage traveled.

The actual assembly of the counter 16 is accomplished by positioning each of the gears 52 and 54 in their respective positions on the shaft 50 with the associated washers 53 and 72 with such then locked into position by the Tinnerman spring lock nut 70. This assembly is done outside the housing 34. The assembly is then slidably positioned in through the opening at the top of the housing 34 to the approximate position indicated in the drawings. In order to then hold such assembled combination in position relative to the housing 34, the shaft 33 is slidably positioned through the extension bearing 40 with the worm section 35 then screwed into its position relative to the gears, as indicated in FIGURE 1. The end of the shaft 33 extends through the housing and is retained from sliding or screwing out for an appropriate snap locking washer 33a, as seen in FIGURE 1.

In order to understand the pivotal mounting of the arm 18, reference should be had to FIGURES 2 and 4 where it is clearly seen that the arm 18 is integrally formed at its pivotal end with a serrated locking plate 100. Such locking plate 100 mates with a similar serrated surface formed on one end of an offset driving arm 102. The locking of the plate 100 with the arm 102 is achieved by a threaded screw 104 threadably received through the arm 102, and journalled at its opposite end in the housing 20. Rotation of the screw 104 may be obtained by an integral wing shaped lever 106. Naturally, loosening of the screw 104 allows the arm 18 to be pivoted independently of the driving arm 102. Therefore, the angular relationship between the offset driving arm 102 and the pivot arm 18 may be adjusted in order to achieve the desired spring loaded positioning of the arm 18 either relative to the frame 10 or the wheel 14, as more fully described hereinafter. The driving arm 102 is formed with a concentric extension 108 at one end thereof to mount a guide pin 110. A snap locking ring 108a holds the guide pin 110 in position on the extension 108. A raised rib 112 extends for a short distance around the circumference thereof. The rib 112 allows the arm 102 to be positioned through the opening in the housing 20 by an angular twisting movement therethrough, with subsequent locking of such arm 102 in position upon the appropriate positioning of the screw 104.

The housing 20 has a top extending arm 20a which mounts one end of a helical concentric spring 120 while the other end is received over the extended end 110a of the guiding pin 110. Thus, it should be clear with reference to FIGURES 1 and 2 that an upward or counterclockwise pivotal movement of the arm 18 will cause a direct drive of the driving arm 102 effectively shifting the resilient bias urging of the spring 120 to allow the arm 18 to be held in place adjacent or substantially parallel to the tubular shaft 10. Naturally, in the position indicated in FIGURE 1, the spring 120 tends to resiliently bias the arm 18 in a direction indicated by the arrow 122.

As stated above, the adjustable relationship of the arm 18 relative to the arm 110 is controlled by the adjustability of the screw 104, and as such controls the "at rest" position of the arm 18. It should be understood that normally the engagement of the bottom of the guide pin 110 with the side wall of the housing 20 will limit the movement into the "at rest" position with such position maintained because of the resilient bias of the spring 120 when the guide pin 110 has moved to this position upon the upward pivoting of the arm 18. Naturally, as the arm 18 is pivoted upwardly, the compression bias of the spring 120 will come to a substantially null position where it is pushing with no lever arm about the mounting axis of the screw 104 or the effective pivotal axis of the arm 18. As the driving arm 102 is then moved on either side of this particular angle, the bias of the spring 120 tends either to hold the arm 18 in the "at rest" position, or in the driving position indicated in FIGURE 1. Naturally, the specific compression of the spring 120 suitably controls the desired bias.

It should be understood that substantially all of the parts comprising the counter and mounting arm bias features can be molded from suitable plastic, thus substantially reducing the cost. Further, the actual construction of the counter and the positioning of the mounting arm relative to the housing 1 requires no nuts or bolts to assemble, thereby further reducing the cost of the apparatus. Since there are no metal parts of any consequence, rusting or deterioration is substantially eliminated. The well known rotating qualities of plastic against plastic insures a smooth operating unit. Suitable bearing supports have been provided for the rotating parts to insure a long and highly effective operating life. The bias provided by the spring 120 insures a smooth and constant contact of the drive wheel 26 with the cart wheel 14, while further allowing a great deal of adjustability because of possible varying angles between the tubular shaft 10 and the axle 12, which angles vary considerably on different golf carts. Also, of course the adjustability between the arm 18 and drive arm 102 allows the lock or rest position to be appropriately varied for the particular golf cart used. The further sliding adjustability of the counter 16 relative to the arm 18 completes the adjustability requirements to adapt the counter to practically any golf cart now on the market.

The mathematical formula utilized to determine the circumference of the drive wheel 26 in order to accurately represent yards traveled on the counter dial is expressed by $$C = \frac{(Y)(36)(N_2 - N_1)}{N_1 N_2}$$

where $Y$ = the number of yards represented on the dial 54a
$N_2$ = number of teeth on gear 54
$N_1$ = number of teeth on gear 52

Therefore, it is seen that the desired objects of the invention have been achieved by providing a very efficient yardage counter made almost entirely from plastic, which incorporates a resilient bias into a normal driving position or a normal at rest position. A simple relative gear displacement principle is utilized to achieve the appropriate yardage indications. Therefore, it is seen that a quality instrument has been provided, which will be highly effective in operation, yet readily adaptable to almost any golf cart to provide a recognized beneficial service to golfers by accurately measuring the distance they are hitting the ball, or the distance the ball should be hit to the green.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. In a yardage counter for a golf cart mounted on support wheels the combination of
   a mounting arm pivotally mounted on the golf cart,
   a counter housing slidably mounted on the arm,
   means to adjustably lock the sliding relation of the housing to the arm,
   a shaft rotatably mounted in the housing and extending out one side thereof,
   a pair of gears mounted in concentric alignment on the shaft whereby one gear is fixed in relation to the shaft and one gear is rotatable, said gears having their teeth extending substantially parallel to the axis of the shaft and in face to face spaced parallel relation with one gear having slightly fewer teeth than the other,
   an indication means affixed to the end of the shaft extending from the housing,
   an index dial operatively affixed to the rotatable gear and extending in spaced parallel adjacent relation to the indication means,
   a worm shaft positioned directly between and simultaneously engaging on opposite sides thereof the teeth of both gears thereby holding the shaft in relation to the counter housing,
   a roller drive mounted on said worm shaft and engaging one wheel of the cart to rotatably drive the worm shaft upon rotation of the wheel, and
   means to resiliently bias the roller drive into contact with the wheel.

2. A yardage counter according to claim 1 whereby the mounting arm may be pivoted to move the roller drive away from the wheel of the cart into adjacent relationship with the golf cart whereby the means resiliently biasing the roller drive into contact with the wheel thereupon resiliently biases the arm into contact with the golf cart.

3. In a portable golf cart yardage indicator adapted to be mounted to the frame thereof and driven by a support wheel the combination of
   a mounting frame secured to the frame of the golf cart and being vertically adjustable relative thereto,
   an elongated arm pivotally mounted at one end to the mounting frame,
   means operatively connected to the mounting frame and to the arm to resiliently urge the arm toward a vertically downward position when it is moved in that direction from a substantially stable vertically upward position,
   a counter frame slidably received on the other end of the elongated arm,
   means to lock the counter frame in a desired adjusted position on the arm,
   a shaft rotatably and slidably received by the counter frame,
   an indicating arm mounted to the end of the shaft,
   a first annular gear having a plurality of teeth slidably received on and in concentric alignment with the shaft inside the counter frame, whereby the teeth are aligned with the shaft,
   a second annular gear having slightly fewer teeth than said first gear slidably received on and in concentric rotatable relation over said shaft inside the counter frame whereby the teeth are in spaced face to face parallel relation with the teeth of the first gear,
   means to resiliently urge the first annular gear into a friction engaged relation with the shaft and limiting the sliding movement of both gears relative to the shaft,
   a worm shaft rotatably received through the counter housing and directly between and simultaneously engaging both the gears on opposite sides thereof whereby rotation of the worm causes rotation of both gears and where the worm shaft limits the sliding relation of the shaft relative to the housing,
   snap lock washer means holding the worm shaft relative to the housing,
   a circular index counter plate affixed to the second gear and positioned in spaced parallel adjacent relation to the indicating arm, and
   means to rotate the worm shaft according to the revolutions of the ground wheel.

4. In a yardage counter for a golf cart mounted on a plurality of wheels the combination of
   a plastic mounting arm pivotally mounted to the golf cart,
   a plastic counter housing slidably received on the mounting arm,
   plastic means to adjustably lock the sliding relation of the housing to the arm,
   a plastic shaft rotatably and slidably received in the housing,
   a pair of plastic gears slidably received in concentric alignment on the shaft, said gears having their teeth extending substantially parallel to the axis of the shaft and in face to face spaced relation with one gear having fewer teeth than the other,
   a plastic indication means affixed to the end of the shaft extending from the housing,
   friction clutch means between one gear and the plastic shaft normally resiliently biasing said one gear in fixed relation to the shaft, and at the same time limiting the sliding movement of both gears relative to the shaft, a plastic index dial operatively affixed to the other gear and extending in spaced parallel adjacent relation to the indication means, a plastic worm shaft slidably received by the housing and positioned between and simultaneously engaging the teeth of both gears and thereby limiting the sliding movement of the shaft relative to the housing, means to limit the sliding movement of the worm shaft relative to the housing, a roller drive mounted on said worm shaft and engaging a wheel of the cart to rotatably drive the worm shaft upon rotation of the wheel, and means to selectively resiliently bias the roller drive into contact with the wheel or to hold the roller drive well out of contact with the wheel, said means comprising an offset driving arm connected at one end in fixed relation to the end of the arm, a guiding pin pivotally mounted to the other end of the driving arm so as to be pivotal in a plane substantially perpendicular to the axis of the driving arm, a helical compression spring slidably carried at one end by the guiding pin and pivotally mounted at the other end to the housing whereby the driving arm is always resiliently biased in one direction or the other dependent on its alignment with the fixed pivot point for the compression spring.

5. An indicator according to claim 3 where the means operatively connected to the mounting frame and to the arm includes an offset driving arm connected at one end in fixed relation to the end of the arm, a guiding pin pivotally mounted to the other end of the driving arm so as to be pivotal in a plane substantially perpendicular to the axis of the driving arm, and a helical compression spring slidably carried at one end by the guiding pin and pivotally mounted at the other end to the housing whereby the driving arm is always resiliently biased in one direction or the other dependent upon its alignment with the fixed pivot point for the compression spring.

References Cited by the Examiner

UNITED STATES PATENTS

| 75,798 | 3/1868 | Prescott et al. | 235—95 |
| 259,562 | 6/1882 | Livingston | 235—95 |
| 537,896 | 4/1895 | Loew | 235—95 |
| 555,659 | 3/1896 | Nutting | 235—95 |
| 703,270 | 6/1902 | Hutchins | 235—119 |
| 845,513 | 2/1907 | Bullard | 235—96 |
| 853,339 | 5/1907 | Boon | 235—96 |
| 2,724,361 | 11/1955 | Coffn | 235—95 X |
| 2,787,420 | 4/1957 | Kofford | 235—122 |

FOREIGN PATENTS

| 136,229 | 11/1902 | Germany. |
| 19,313 | 10/1894 | Great Britain. |
| 489,514 | 7/1938 | Great Britain. |

LEO SMILOW, *Primary Examiner.*

C. G. COVELL, *Assistant Examiner.*